| United States Patent [19] | [11] | 4,071,595 |
|---|---|---|
| Komarek et al. | [45] | Jan. 31, 1978 |

[54] METHOD OF FORMING FLUORITE BRIQUETTES

[75] Inventors: Karl R. Komarek, Chicago; Richard K. Komarek, Elk Grove Village, both of Ill.

[73] Assignee: Lost River Mining Corporation Limited, Toronto, Canada

[21] Appl. No.: 646,920

[22] Filed: Jan. 6, 1976

Related U.S. Application Data

[63] Continuation of Ser. No. 450,601, March 13, 1974, abandoned.

[51] Int. Cl.² .................... C04B 35/64; F27B 9/04; B29F 5/00; C22B 1/11
[52] U.S. Cl. .............................................. 264/66; 75/5; 106/73.1; 264/125; 423/490
[58] Field of Search .............. 106/73.1; 264/56, 66, 264/332, 125; 423/490; 75/5

[56] References Cited

U.S. PATENT DOCUMENTS

| 3,027,227 | 3/1962 | Coxey | 264/56 X |
| 3,276,860 | 10/1966 | Lintz | 75/5 X |
| 3,359,066 | 12/1967 | Hatch | 106/73.1 X |

*Primary Examiner*—Thomas P. Pavelko
*Attorney, Agent, or Firm*—Fetherstonhaugh & Co.

[57] ABSTRACT

A method of forming fluorite briquettes from a fluorite flotation concentrate wherein the fine dry powder of the fluid concentrate is preheated, briquetted under pressure and fired after the formation of the briquettes to form solid dust free briquettes.

1 Claim, No Drawings

METHOD OF FORMING FLUORITE BRIQUETTES

This is a continuation of application Ser. No. 450,601, filed Mar. 13, 1974, now abandoned.

FIELD OF INVENTION

This invention relates to a method of forming fluorite briquettes.

PRIOR ART

As a result of the depletion of the high grade fluorite deposits such as the mass vein or lode type deposits, it is becoming both essential and more economically practical to mine the lower grade finely disseminated fluorite deposits. The calcium fluorite content of the lower grade finely disseminated deposits is usually marketed as a flotation concentrate. The concentration process is effected close to the mining source so that only the concentrate is shipped to the user.

Without the addition of a binding ingredient difficulty has been experienced in attempting to form fluorite briquettes from a flotation concentrate which will not break down to a fine powder during shipping and which will be waterproof. Briquettes which break down during shipping and handling undergo substantial losses in the form of fine dust and in many cases restrict the end use of the product. Briquettes which are not waterproof absorb water and tend to break down to form a slurry which is unsuitable for the end use of the product and which is difficult to ship and handle.

A major use of fluorite is in the steel making industry where it acts as a flux which removes impurities during melting and which improves separation of metal and slag by increasing slag fluidity. It is used in the open-hearth, basic oxygen and electric furnace processes and also in steel foundries. Until recent times, the major portion of fluorite used in the steel industry has been in the form of lump fluorspar which has been produced from high grade vein type deposits and usually beneficiated to the requisite size and grade required by an ore dressing process involving gravity separation means.

It has been proposed to form briquettes with the addition of a binder. The use of a binder in the formation of a briquette has two distinct disadvantages. In the first case, the binder may add an impurity to the process in which the fluorite is subsequently used such as in steel making. The further problem associated with the use of a binder is that the binder must be shipped to the briquetting site which, as previously indicated, is usually close to the mining site. This not only increases the cost of the briquetting operation, but also reduces the sales value of the briquettes by downgrading their $CaF_2$ content. At the same time, the freight cost of the briquettes to the end user is increased by the amount of binder that is needed.

SUMMARY OF INVENTION

The present invention overcomes the difficulties of the prior art described above and provides a method of forming a fluorite briquette which has a high degree of resistance to crumbling and which is waterproof. According to an embodiment of the present invention, a method of forming fluorite briquettes from a fluorite flotation concentrate in the form of a fine powder comprises the steps of preheating the fine powder and briquetting the preheated fine powder under pressure and thereafter firing the briquettes to form strong dry waterproof briquettes.

EXAMPLE 1

A 90% fluorite calcium carbonate concentrate of an ore flotation concentration process in the form of a fine dry powder 85% — 325 mesh was preheated to a temperature of about 1000° F. The powder was formed to briquettes between the rolls of a two-roll mill model B-1000 manufactured by K. R. Komarek, Inc., Illinois. The roll pressures employed were of the order of 60,000 p.s.i. After briquetting, the briquettes were fired to a temperature of about 1500° F. The resultant briquettes proved to be very hard, resistant to crumbling and waterproof.

EXAMPLE 2

An 80% fluorite calcium carbonate concentrate of an ore flotation concentration process in the form of a fine dry powder 85% — 325 mesh was preheated to a temperature of about 1000° F. The powder was formed to briquettes between the rolls of a two-roll mill model B-1000 manufactured by K. R. Komarek, Inc., Illinois. The roll pressures employed were of the order of 60,000 p.s.i. After briquetting the briquettes were fired to a temperature of about 1500° F. The resultant briquettes proved to be very hard, resistant to crumbling and waterproof.

EXAMPLE 3

A 90% calcium fluorite, calcium carbonate concentrate of a flotation fluorite ore concentration process in the form of a fine powder 85% — 325 mesh was preheated to a temperature of the order of 1,100° F. and a 3% silicate binder was added. The briquettes were then formed in the apparatus previously described at a briquetting pressure of the order of 40,000 p.s.i. The briquettes were not subsequently fired. The resultant briquettes proved to have a very poor strength and weakened on standing in air.

As a result of these tests and numerous other tests which have been carried out, it has been discovered that fluorite briquettes of high quality which are resistant to breakdown may be formed without the aid of a binder by including both a preheating step and a post-firing step. The fluorite concentrate is preheated to a temperature in the range of 250° F to 1100° F with a preferred temperature range of the order of about 300° F to 500° F. The briquetting operation is carried out with briquetting pressures in the range of 50,000 to 85,000 p.s.i. The firing of the briquettes is preferably carried out in the temperature range of 1400° F to 1600° F.

What we claim as our invention is:

1. A method of forming fluorite briquettes, from a +80% fluorite flotation concentrate of an ore floatation concentration process, in the form of a fine dry powder, without the addition of a binder, comprising the steps of:
   a. preheating the fine powder concentrate to a temperature in the range of 250° F to 1000° F,
   b. briquetting said preheated fine powder concentrate between the rollers of a roll press at pressures of the order of about 60,000 p.s.i., and discharging the briquettes from the roll press and thereafter
   c. firing the briquettes to a temperature of about 1500° F to form solid dust free briquettes.

* * * * *